June 3, 1958 — G. BAECHLI — 2,837,202

SUSPENSION TROUGHING IDLER

Filed Aug. 29, 1955

Inventor:
George Baechli.
by Louis F. Maxson,
Attorney.

United States Patent Office

2,837,202
Patented June 3, 1958

2,837,202
SUSPENSION TROUGHING IDLER

George Baechli, New Philadelphia, Ohio, assignor to Joy Manufacturing Company, Pittsburgh, Pa., a corporation of Pennsylvania Application August 29, 1955, Serial No. 531,185

3 Claims. (Cl. 198—192)

This invention relates to troughing idlers for conveyor belts and more particularly to flexible troughing idlers of the suspension type. It relates both to the construction of such idlers and to the supporting arrangements therefor. The present invention is an improvement over the construction shown for purposes of illustration in my copending application Serial No. 407,773, filed February 2, 1954, now abandoned. In that application there is shown a troughing idler comprising an appropriate length of wire cable having tubular sleeves secured to its opposite ends, said sleeves being mounted in appropriate bearings and said cable lengths and portions of said sleeves having bonded to them a covering extending throughout the full length of the cable between the sleeves and over a portion of each sleeve, and comprising a plurality of idler rollers for engaging and supporting a belt and relatively thin sheath portions intermediate the idler rollers, said covering made of rubber, neoprene or other rubber-like material. In said application the sleeves snugly fitted the cable end portions throughout their lengths and were peened to the latter and extended a substantial distance into the end idler rollers and also extended into appropriate bearings. The extension of the sleeves into the end idler rollers improved the life of the troughing idler structure in that the concentration of bending stresses at the inner ends of the sleeves was reduced, and it improved the life of the cable because access of water or other harmful liquids to the wire of the cable was made more difficult.

According to the present invention which relates more particularly to improvements largely centering about the cable ends and sleeves and the bearings for the latter, I have provided for a further reduction of stresses in the cable at its entrance to the sleeves, further improved the securing of the end idlers to the sleeves and the protection against leakage of liquids along the ends of the sleeves into the end idlers and then to the cable, and improved the mode of support of the sleeves in bearings so that not only longitudinal but also lateral resilience is provided. More specifically, in the illustrative embodiment disclosed the end idlers have the sleeves, which are illustrated as peened to the cable ends, extend for a considerable distance into the body of the idlers and the material of the idlers is caused to interlock as through a suitable annular groove entered by the material of the idlers with the periphery of the sleeves, and the sleeves are formed internally with bell mouths so that the material of the idlers extends for a substantial distance in a tapering annular portion into the bell mouths of the sleeves, thus providing additional sealing and also a resilient cushion between the cable and the innermost ends of the sleeves. Moreover, the sleeves at their portions projecting out of the end idlers are received in appropriate antifriction bearings whose inner races are formed of coaxial tubular elements or bearing sleeves between which there is mounted a rubber or other resilient sleeve which holds the coaxial tubular elements or bearing sleeves both against axial movement of material extent and also provides some resiliency between them.

In the accompanying drawings in which one form which the invention may assume is shown for purposes of illustration:

Figure 1:
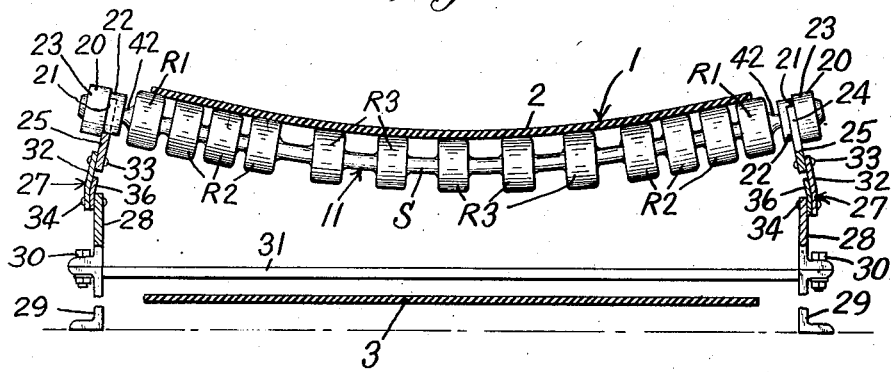
Fig. 1 shows my improved suspension troughing idler and the mounting therefor and upper and lower runs of a belt.

Referring now to the drawings and noting first Fig. 1, it may be observed that the position of the parts illustrated is that which corresponds to a fairly fully loaded belt. A conveyor belt generally designated 1 includes an upper active troughed run 2 and a lower flat return run 3. The return run may be provided with any suitable guiding means, for example suitably supported and journaled cylindrical guide rollers, not shown because such structures are quite conventional.

The active troughed run 2 of the belt is supported by a suspension idler structure or element generally designated 11. This includes a steel cable 12 (see Fig. 2). A standard ⅜" diameter cable having thirty-six strands each consisting of seven wires without hemp core, and constructed wholly of steel is satisfactory, but it will of course be understood that these details are provided only for purposes of illustration and are not to be considered as limiting. To the extreme ends of the cable there are connected, as by peening, sleeve elements 13. These are shown as of uniform external diameter save for a groove 14 at one end for the reception of a split holding or snap ring and a groove 15 adjacent the opposite end for interlock with the material of the end idler roller which is shortly to be mentioned. It will be evident that the outside diameter of these sleeves 13 may be varied, as well as uniform, if desired to improve their cooperation with bearing structures selected. The sleeves are so firmly peened to the ends of the cable that they cannot be detached by pulls within the possible loading of the troughing idlers.

The sleeves are received in appropriate bearing structures later to be described in more detail and generally designated 17. The bearing structures are supported in sleeve-like elements 20 provided with annular shoulders 21 each formed between a smaller diameter portion 22 and a larger diameter portion 23. Forked upper end portions 24 of upper bracket elements 25 shortly to be described in detail, provide recesses 26 in which the smaller diameter portions 22 of the elements 20 are received and against which the shoulders 21 engage. The bracket elements 25 are suitably resiliently connected by structures 27 with lower bracket elements 28 which are illustrated as carried by bottom bracket sections 29 to which they are secured as by bolt and nut devices 30. A cross-plate 31 is shown and this may be integrally connected with the bracket sections 29, which sections may desirably be channel irons resting on edge on a subjacent surface. The structures 27 are shown as comprising main springs 32 secured as at 33, as by rivets, to the upper bracket elements 25, and as at 34 to the lower bracket elements 28. Between the springs 32 and the elements 28 there are, held by the rivets 34, helper springs 36 having portions projecting above the tops of the elements 28 and diverging inwardly from a vertical plane whereby, in the position of the parts shown in Fig. 1, they may be engaged by the springs 32 and as it were greatly stiffen the action of the latter.

Within each of the sleeve-like elements 20 there is provided a radial thrust bearing 35 and a radial and axial thrust bearing 37, and an external bearing sleeve 38 is mounted in the inner races of these bearings. Between the sleeve 38 and an inner bearing sleeve 39 there is a suitable resilient sleeve 40, as of rubber, which is under such pressure that it prevents slipping of the inner sleeve 39 relative to the external sleeve 38, and which also provides radial resiliency. The sleeve 13 is held within the inner bearing sleeve 39 by a snap ring received in the groove 14.

By virtue of the construction described it will be appreciated that tilting of the axis of each sleeve 13 is possible as increases in the belt load take place, that each of the resilient sleeves 40 reduces the transmission of longitudinal shocks to each of the bearings and also reduces the transmission of radial shocks to each of the bearings and provides for a certain degree of very beneficial resilience in the mountings of the ends of the troughing idlers. Indeed it constitutes in effect a vibration-dampener between the sleeve 13 and the bearings supported thereon.

Figure 2:
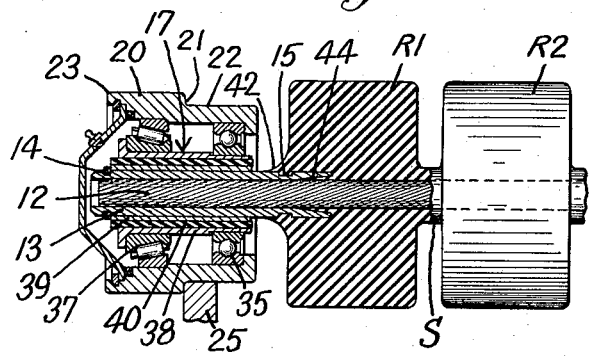
Fig. 2 is a fragmentary vertical section on a larger scale, taken on the plane including the axis of the suspension troughing idler element and an end bearing therefor showing details of the improved construction.
Figure 3:
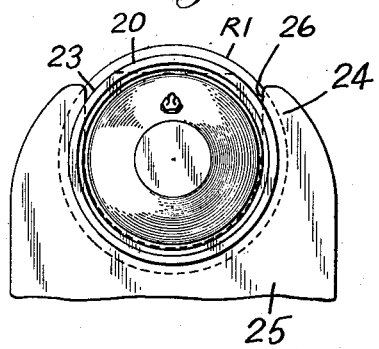
Fig. 3 is an end view of one of the supports for a bearing structure shown in elevation in Figure 1 and in central longitudinal vertical section in Figure 2.

With respect to the troughing idler 11, it will be noted that the cable 12 and the sleeves 13 provide support for a plurality of idler rollers. These are designated R1, R2, R3 etc., R1 being the end rollers, R2 series (three) of other rollers closely spaced relative to each other and to the end rollers R1, and R3 being a series of rollers between the most adjacent rollers R2, and being spaced much farther apart from the rollers R2 and from each other than the distances between the rollers R2 and the distances between the rollers R1 and the most adjacent rollers R2. Between each roller and the one next to it, the cable is provided with a sheath of rubber-like material which may be, advantageously, neoprene. These sheaths are indicated by S. The sheaths and the idler rollers are all bonded to the cable and, in addition, the idler rollers R1 are bonded to the sleeves 13, which extend as shown in Fig. 2 a substantial distance into the rollers R1, with the result that the rollers R1 are each bonded both to the cable 12 and to one of the sleeves 13.

It has been noted that each sleeve 13 has an annular groove 15 and the material of the roller R1 is pressed into this annular groove, thus providing two things: (1) an increased security of attachment to the sleeve 13 and reduced possibility of relative axial movement, and (2) an improved sealing between the material of the roller R1 and the sleeve 13 since the bonding action takes place throughout the full extent of the sides and bottom of the groove and is carried, as indicated at 42, a substantial distance along the sleeve 13 beyond the end of the groove. It will be noted, moreover, that the inner end of each sleeve 13 is formed internally with a bell mouth as it were at 44, the internal diameter being considerably greater at the innermost end of the sleeve 13 than the uniform internal diameter of the sleeve within the bearings, and this internal diameter at the inner end tapers from the larger diameter to the uniform diameter. During the bonding of the idlers and sheaths on the cable and on the sleeves the material of which the idlers and sheaths are formed is forced into the bell mouthed inner ends of the sleeves, and, when the bonding is completed, there is an additional seal against the entrance of moisture to the cable provided and also a reduction of concentration of stress between the sleeve and the cable, as compared with the construction where the sleeve fits the cable snugly at its own innermost end.

By reason of the arrangements shown and described it will be apparent that an improved suspension troughing idler arrangement is provided in which concentration of stresses in the cable is reduced, the danger of moisture attaining access to the cable and rusting it out is reduced, and improved operation is provided by having the sleeves 13 and 39 not only capable of axial yielding to the presence of the spring mounting, but having an associated yielding support through the rubber or rubber-like sleeve 40, and also a reduction in the transmission of shock in radial as well as axial directions. In the absence of this sleeve 40 the bearings, except for the relief provided by their spring mountings, would have to take the full shocks due to variations and pull on the ends of the cable and there would be virtually no protection against the transmission of radial shocks to the bearings.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. A suspension belt-troughing idler structure including spaced brackets supporting bearings spaced more widely than the width of a belt to be supported and guided and a flexible element extending between and rotatably supported by said bearings and having idler rollers fixed to it, said flexible element being a wire cable and the idler rollers fixed to the flexible element being bonded on the cable, and the cable having a sheath of the same material as and of one piece with said idler rollers bonded to and covering the same between said rollers, said flexible element having end sleeves supported by said bearings, respectively, and said bearings having between them and said sleeves a pair of coaxial sleeves, respectively, each pair having between them a resilient sleeve fixed against longitudinal movement with respect to them and under radial compression between them for limiting the effect of radial vibration of said flexible element upon said bearings, and means for preventing axial movement of said end sleeves inwardly with respect to the inner ones of said coaxial sleeves, respectively, when the idler structure is loaded thereby limiting the effect of axial vibration of said flexible element upon said bearings.

2. A suspension belt-troughing idler structure for a conveyor belt including supports supporting bearings spaced more widely than the width of a belt to be supported and guided and a flexible element extending between and rotatably supported by said bearings and having an idler roller fixed to it, said flexible element having end sleeves supported by said bearings, respectively, and said bearings having between them and said sleeves a pair of coaxial sleeves, respectively, each pair having between them a resilient sleeve fixed against longitudinal movement with respect to them and under radial compression between them for limiting the effect of radial vibration of said flexible element upon each of said bearings, and means for preventing axial movement of said end sleeves inwardly with respect to the inner ones of said coaxial sleeves, respectively, when the idler structure is loaded thereby limiting the effect of axial vibration of said flexible element upon said bearings.

3. A suspension belt-troughing idler structure for a conveyor belt including supports supporting bearings spaced more widely than the width of a belt to be supported and guided and a flexible element extending between and rotatably supported by said bearings and having an idler roller fixed to it, said flexible element having sleeves secured to its ends, respectively, said sleeves having portions extending outwardly into and supported by said bearings, respectively, said bearings having between them and said portions a pair of coaxial sleeves, respectively, each pair having between them a resilient sleeve fixed against longitudinal movement with respect to them and under radial compression between them for limiting the effect of radial vibration of said flexible element upon each of said bearings, and means for preventing axial movement of said portions inwardly with respect to the inner ones of said coaxial sleeves, respectively, when the idler structure is loaded, thereby limiting the effect of axial vibration of said flexible element upon said bearings.

References Cited in the file of this patent

UNITED STATES PATENTS 2,414,335  Schroeder _____ Jan. 14, 1947

FOREIGN PATENTS 553,760  Great Britain _____ June 3, 1943